(12) United States Patent
Xu et al.

(10) Patent No.: US 11,954,592 B2
(45) Date of Patent: Apr. 9, 2024

(54) COLLABORATIVE DEEP LEARNING METHODS AND COLLABORATIVE DEEP LEARNING APPARATUSES

(71) Applicant: Tsinghua University, Beijing (CN)

(72) Inventors: Ke Xu, Beijing (CN); Zhichao Zhang, Beijing (CN); Bo Wu, Beijing (CN); Qi Li, Beijing (CN); Songsong Xu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 888 days.

(21) Appl. No.: 17/012,494

(22) Filed: Sep. 4, 2020

(65) Prior Publication Data

US 2020/0401890 A1 Dec. 24, 2020

Related U.S. Application Data

(63) Continuation of application No. PCT/CN2019/114984, filed on Nov. 1, 2019.

(30) Foreign Application Priority Data

May 7, 2019 (CN) .......................... 201910375181.9

(51) Int. Cl.
*G06N 20/00* (2019.01)
*G06N 3/04* (2023.01)
(Continued)

(52) U.S. Cl.
CPC ................ *G06N 3/08* (2013.01); *G06N 3/04* (2013.01); *G06N 20/00* (2019.01); *H04L 9/0637* (2013.01)

(58) Field of Classification Search
None
See application file for complete search history.

(56) References Cited

U.S. PATENT DOCUMENTS

2018/0285996 A1* 10/2018 Ma .................... H04L 9/3297
2019/0279107 A1* 9/2019 Wang ................. G06N 20/00
(Continued)

FOREIGN PATENT DOCUMENTS

| CN | 104200087 | 12/2014 |
| CN | 109388661 | 2/2019 |
| CN | 109685501 | 4/2019 |

OTHER PUBLICATIONS

SIPO, Office Action for CN Application No. 2019103751819, dated Dec. 25, 2020.

*Primary Examiner* — David R Vincent
(74) *Attorney, Agent, or Firm* — Hodgson Russ LLP

(57) ABSTRACT

The disclosure provides a collaborative deep learning method and a collaborative deep learning apparatus. The method includes: sending an instruction for downloading a global model to a plurality of user terminals; receiving a set of changes from each user terminal; storing the set of changes; recording a hash value of the set of changes into a blockchain; obtaining a storage transaction number from the blockchain for the hash value of the set of changes; sending the set of changes and the storage transaction number to the plurality of user terminals; receiving the set of target user terminals from the blockchain; updating the current parameters of the global model based on sets of changes corresponding to the set of target user terminals; and returning the sending instruction, to update the global model until the global model meets a preset condition.

18 Claims, 6 Drawing Sheets

(51) Int. Cl.
*G06N 3/08* (2023.01)
*H04L 9/06* (2006.01)

(56) References Cited

U.S. PATENT DOCUMENTS

2021/0342946 A1* 11/2021 Leise ................. G06Q 20/4015
2021/0375409 A1* 12/2021 Romantsov ......... H04L 67/1097

* cited by examiner

COLLABORATIVE DEEP LEARNING METHODS AND COLLABORATIVE DEEP LEARNING APPARATUSES

CROSS-REFERENCE TO RELATED APPLICATION

This application is a continuation of International Application No. PCT/CN2019/114984, filed Nov. 1, 2019, which claims priority to Chinese Patent Application No. 201910375181.9, filed on May 7, 2019, the entire disclosures of which are incorporated herein by reference.

FIELD

The disclosure relates to the field of machine learning technologies, and more particularly, to a collaborative deep learning method, and a collaborative deep learning apparatus.

BACKGROUND

Deep learning has made breakthroughs in fields such as image recognition, voice recognition, and recommendation systems. However, affected by the computing power of computers and problems of algorithms such as vanishing gradient, ideal training or learning results of deep models may be not easy to reach. Research has shown that during training deep models, features of data are reflected in changes on parameters of the models. Therefore, collaborative deep learning appears, which allow different users to share features of different data sources through sharing parameters of the models, without directly publishing the data sources. However, in the collaborative deep learning, it needs to prevent malicious users or low-quality data sources from negatively affecting the models.

SUMMARY

A first aspect of the disclosure proposes a collaborative deep learning method, including: sending an instruction for downloading a global model to a plurality of user terminals, the global model having a set of current parameters, such that each of the plurality of user terminals downloads the global model based on the instruction, and trains the global model based on a set of training data to generate a set of changes on a part of the current parameters; receiving the set of changes from each of the plurality of user terminals; storing the set of changes from each of the plurality of user terminals; recording a hash value of the set of changes from each of the plurality of user terminals into a blockchain; obtaining a storage transaction number from the blockchain for the hash value of the set of changes from each of the plurality of user terminals; sending the set of changes from each of the plurality of user terminals and the storage transaction number to the plurality of user terminals, such that each of the plurality of user terminals verifies and evaluates received sets of changes and storage transaction numbers based on a set of verification data, to generate a plurality of evaluation values, and stores the plurality of evaluation values into the blockchain, and the blockchain updates an evaluation matrix based on the plurality of evaluation values from each of the plurality of user terminals, and select a set of target user terminals based on the updated evaluation matrix and a preset consensus contract in the blockchain from the plurality of user terminals; receiving the set of target user terminals from the blockchain; updating the current parameters of the global model based on sets of changes corresponding to the set of target user terminals; and returning the sending the instruction for downloading the global model to the plurality of user terminals, to update the global model until the global model meets a preset condition.

A second aspect of the disclosure proposes a collaborative deep learning apparatus, including: a processor; and a memory for storing instructions executable by the processor; in which the processor is configured to carry out the above collaborative deep learning method.

Additional aspects and advantages of embodiments of the disclosure will be given in part in the following descriptions, become apparent in part from the following descriptions, or be learned from the practice of the embodiments of the disclosure.

BRIEF DESCRIPTION OF THE DRAWINGS

These and other aspects and advantages of embodiments of the disclosure will become apparent and more readily from the following descriptions made with reference to the drawings, in which.

DETAILED DESCRIPTION

Descriptions will be made in detail to embodiments of the disclosure in the following, examples of which are illustrated in the accompanying drawings. The following description refers to the drawings in which the same or similar numbers in different drawings represent the same or similar elements or the elements having the same or similar functions throughout the descriptions. The embodiments described herein with reference to the drawings are explanatory, illustrative, and used to generally understand the disclosure. The embodiments shall not be construed to limit the disclosure.

Structures and scales of deep models are increasing, and data required in training the models are increasing accordingly. For the same training target, training with a single data source often fails to obtain a deep model with strong generalization ability and high accuracy. Furthermore, due to privacy of data sources, exchanging private data sources will be punished by law. A collaborative deep learning solution, provided in the disclosure, devises a technical mechanism that, for various scenarios, the same deep model may be collaboratively trained by using characteristics among training data sets of different users under the premise of the training data sets being not published. This mechanism not only allows users with the same training goal to collaboratively train to obtain a deep model with strong generalization ability and high accuracy, but also allows users not to disclose the data sets, which protects the privacy of the data sets.

At the same time, based on the trusted storage characteristics of the blockchain, it is ensured that any participating entity in the collaborative learning process cannot maliciously tamper with intermediate parameters, reach a consensus election on the optimal parameters among training users by using the consensus mechanism of contracts on the chain, and ensure that only the optimal parameters agreed by all users in the training process can update the global model. That is, this technical solution can tolerate the existence of some participants with low-quality data sets, and ensures the stable convergence of the global model.

Figure 1:
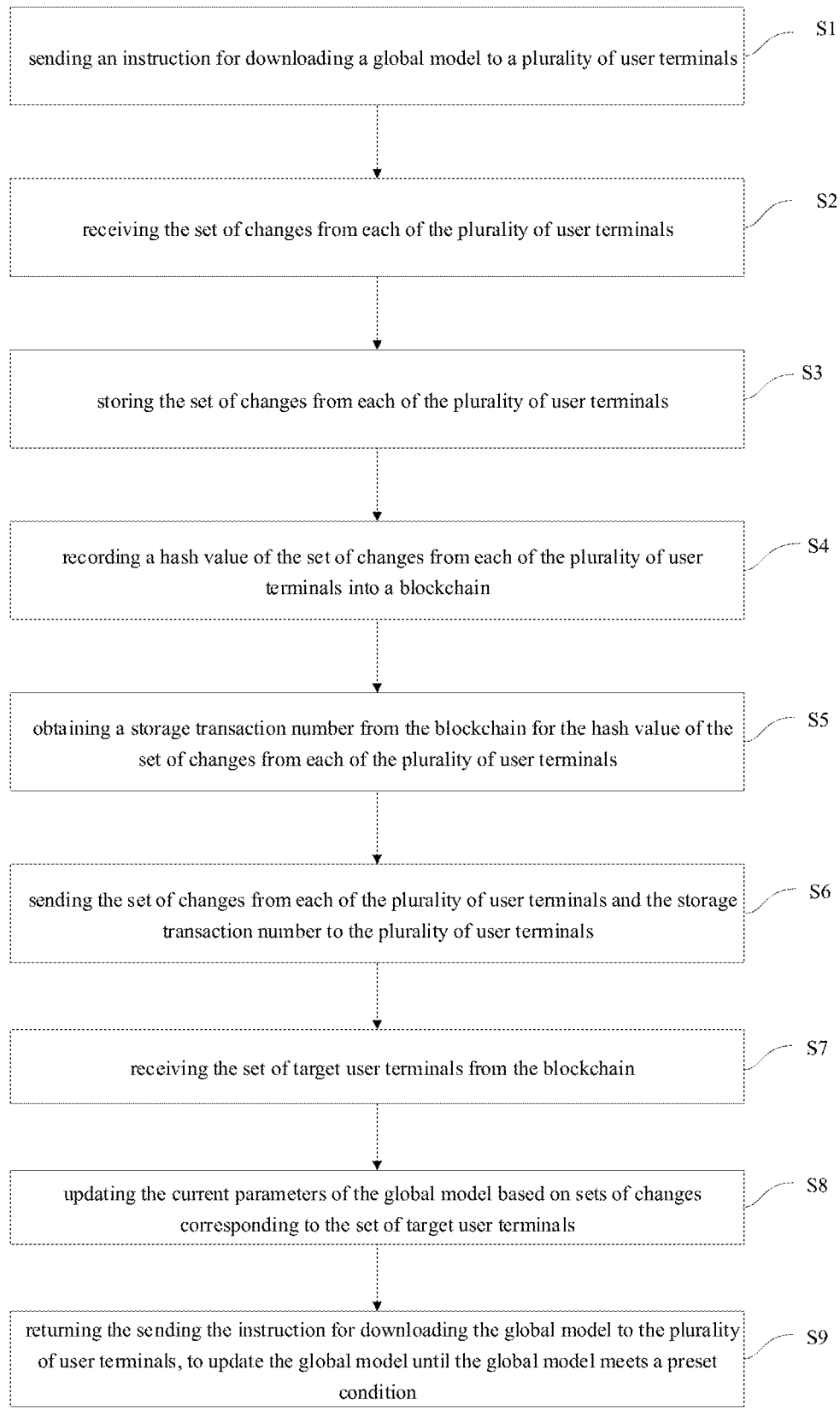
FIG. 1 is a flowchart illustrating a collaborative deep learning method according to embodiments of the disclosure.

FIG. 1 is a flowchart illustrating a collaborative deep learning method according to embodiments of the disclosure. As illustrated in FIG. 1, the method is implemented by a server and includes the following.

At block S1, an instruction for downloading a global model is sent to a plurality of user terminals. The global model has a set of current parameters.

In an embodiment, if the global model is trained for the first time, the current parameters are initialization parameters. The initialization parameters are initialized by the server. If the global model is not trained for the first time, the current parameters are parameters which are updated at the last training.

In an embodiment, the global model is negotiated by the plurality of user terminals and maintained by the server. That is, the plurality of user terminals may train the global model using the same training manner.

After the server sending the instruction for downloading the global model to the plurality of user terminals, each of the plurality of user terminals downloads the global model based on the instruction, and trains the global model based on a set of training data to generate a set of changes on a part of the current parameters. In detail, each of the plurality of user terminals trains the global model based on the set of training data to generate a set of changes on the current parameters, and ranks changes in the set of changes on the current parameters in descending order, and selects the set of changes on the part of the current parameters from the set of changes on the current parameters based on a ranking result.

In an embodiment, each of the plurality of user terminals, through a ratio, selects the set of changes on the part of the current parameters from the set of changes on the current parameters based on the ranking result.

In an embodiment, the set of changes from each of the plurality of user terminals, is added with a timestamp by each of the plurality of user terminals, and is signed by each of the plurality of user terminals.

At block S2, the set of changes from each of the plurality of user terminals is received.

At block S3, the set of changes from each of the plurality of user terminals is stored.

At block S4, a hash value of the set of changes from each of the plurality of user terminals is recorded into a blockchain.

At block S5, a storage transaction number is obtained from the blockchain for the hash value of the set of changes from each of the plurality of user terminals.

At block S6, the set of changes from each of the plurality of user terminals and the storage transaction number are sent to the plurality of user terminals, such that each of the plurality of user terminals verifies and evaluates received sets of changes and storage transaction numbers based on a set of verification data, to generate a plurality of evaluation values, and stores the plurality of evaluation values into the blockchain, and the blockchain updates an evaluation matrix based on the plurality of evaluation values from each of the plurality of user terminals, and select a set of target user terminals based on the updated evaluation matrix and a preset consensus contract in the blockchain from the plurality of user terminals.

In an embodiment, a number of user terminals in the set of target user terminals is less than a number of the plurality of user terminals.

In an embodiment, the blockchain updates the evaluation matrix based on the plurality of evaluation values from each of the plurality of user terminals by actions: marking $M_{i,:}$ as evaluation values of the $i^{th}$ user to all users, where M represents the evaluation matrix, and $M_{i,j}$ represents an evaluation value of the $i^{th}$ user to the r user; ranking $M_{i,:}$ in descending order as $\hat{M}_{i,:}$, in which, a score of the $j^{th}$ user is denoted, based on an arrangement of $\hat{M}_{i,:}$, by a formula of:

$$s(j) = \begin{cases} m - p_j + 1, & m \geq p_j - 1 \\ 0, & \text{else} \end{cases},$$

where, s(j) represents the score of the $j^{th}$ user, m represents the number of the plurality of users, and $p_j$ represents a location of the $j^{th}$ user in $\hat{M}_{i,:}$; obtaining a total score of the $j^{th}$ user by a formula of:

$$S(j) = \sum_{u_i \in \vec{u}}^{i \neq j} s(j; u_i)$$

where, $u_i$ represents the $i^{th}$ user, $\vec{u}$ represents the plurality of users, $s(j; u_i)$ represents a score of the $j^{th}$ user under evaluation of $u_i$; and selecting the set $\overrightarrow{C_{new}}$ of target user terminals by a formula of: $\overrightarrow{C_{new}}$=argmax S(j; $\vec{u}$), $|\overrightarrow{C_{new}}|$=n, n is less than m.

At block S7, the set of target user terminals from the blockchain is received.

In detail, a contract event triggered in the blockchain is monitored by the server, and the set of target user terminals is received by the server from the blockchain when the contract event triggered in the blockchain is monitored.

At block S8, the current parameters of the global model are updated based on sets of changes corresponding to the set of target user terminals.

At block S9, it returns to block S1, to update the global model until the global model meets a preset condition.

In an embodiment, the preset condition includes an accuracy rate of the global model reaching an expected value or a number of training rounds reaching a preset value.

After completing one training of the global model, the server may send an instruction for downloading the latest global model to all user terminals again, and training and update may be performed again. Through multiple iterations, until the global model meets the preset condition, such as the accuracy rate of the model reaching the user's expected value, or the number of training rounds being large enough, the iteration ends, and the sign of ending the collaborative training may be set according to actual needs.

The collaborative learning method provided in the disclosure may establish a privacy-friendly distributed collaborative learning mechanism. Participants save their data sets locally and collaborate with other participants through parameter sharing. Participants do not disclose their data sets during the collaboration process. At the same time, in scenarios, the quality of the data sets is universal. The method of the disclosure can ensure the consistency of parameter interaction and the privacy of the data sets, and may ensure the smooth convergence of the global model through the election of consensus contract.

Figure 2:
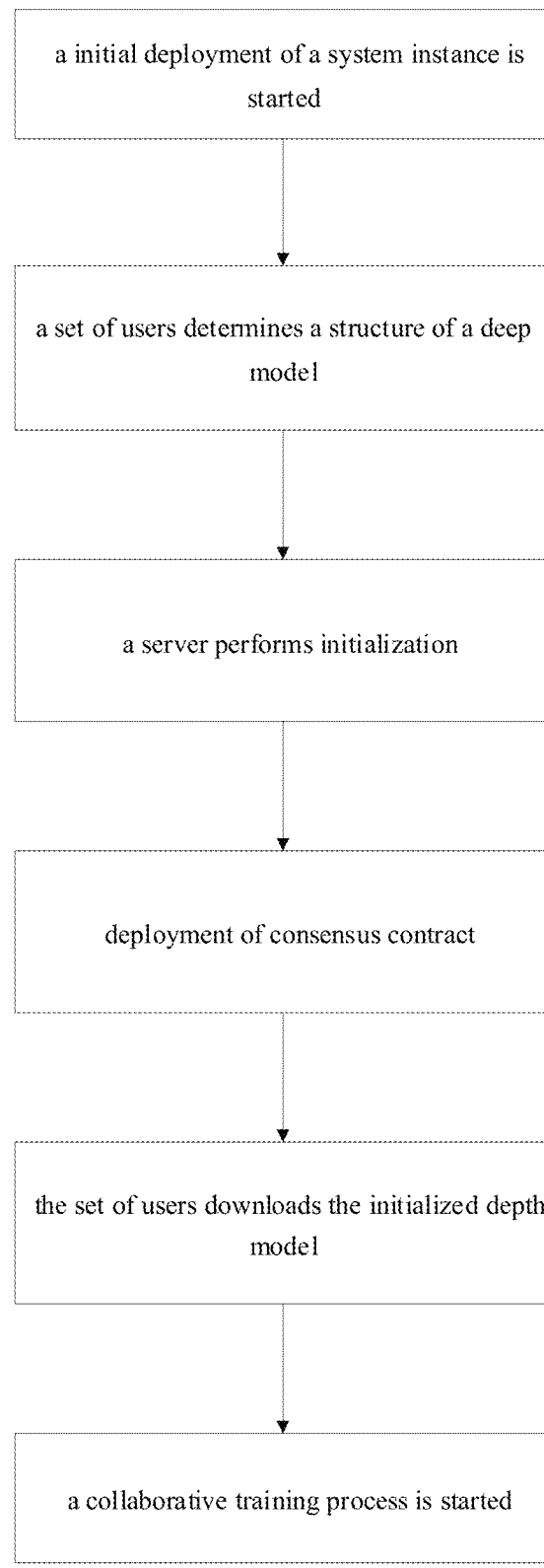
FIG. 2 is a flowchart illustrating an initialization of a system for implementing a collaborative deep learning method according to embodiments of the disclosure.

As illustrated in FIG. 2, an initialization of a system for implementing a collaborative deep learning method, or an initial deployment of a system instance, which includes 5 steps as follows.

Step 1, m users (or m user terminals) participating in the collaborative learning may negotiate a common deep model, i.e., the global model. The model is maintained globally by the server.

Step 2, the server performs the initialization. The initialization has two parts, that is, a set of target user terminals (or, a target user list) may be initialized, and the model may be initialized randomly. Then, the server notifies all participating users of downloading the initialized model.

It should be understandable that the server is employed as an intermediate bridge to realize the information interaction between each user and the blockchain, thereby updating the training of the global model in a collaborative learning manner.

It is assumed that there are m users, and n (n<m) users are selected as the target users of each round of training for updating the global model, in which the global model has k parameters.

The target users (it can be empty or any set) may be initialized, and the parameters of the global model may be initialized randomly, which are denoted as formulas of:

$$\vec{C} = [c_1, c_2, \ldots, c_n],$$

$$\vec{\theta}_g = [\theta_1, \theta_2, \ldots \theta_k],$$

where, k represents the number of the current parameters of the global model, $\theta_i$ (i=1, 2, ... or, k) represents a current parameter of the global model, $c_i$ (i=1, 2, ... or, n) represents a target user, $\vec{\theta}_g$ represents a set of current parameters, and $\vec{C}$ represents a set of target user terminals or a set of target users.

Step 3, the consensus contract may be deployed. The contract first initializes the evaluation matrix M, and secondly, some important parameters need to be set in the consensus contract, such as the number n of target users in each round of training.

Step 4, all users participating in collaborative training download the initialized deep model from the server. It should be ensured that the model for initial training for all users may be consistent. Therefore, the server is required to initialize the model randomly, and all users may train on the basis of the same randomly initialized model.

Step 5, each user prepares the set of training data and the set of verification data, and uses the set of training data to train the initialized deep model to start the collaborative learning process.

Figure 3:
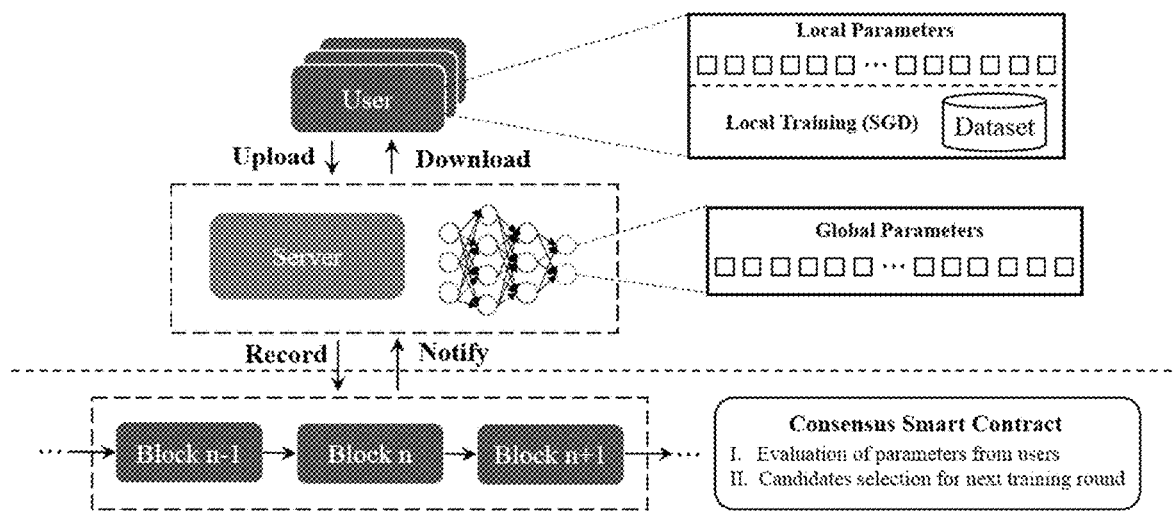
FIG. 3 is a schematic diagram of collaborative learning entities and their connection relationships according to an embodiment of the disclosure.

As illustrated in FIG. 3, it shows three entities involved and their interaction processes in the collaborative learning process. The implementation of each entity may be summarized as follows.

The first part is the user group (a plurality of user terminals or a plurality of users). Each user may download the deep model from the server for training. Each user has the set of training data and the set of verification data, which are stored in a dataset, and conducts local training through stochastic gradient descent (SGD) on the downloaded model. When the local training is over, the user selects the corresponding parameter change list (i.e., the set of changes on the part of the current parameters of the model) based on local parameters of the model that is trained locally, and attaches a timestamp with the list and signs, and then uploads it to the server to prevent others from copying (or replaying) the corresponding changes. At the same time, every time a new parameter change list is uploaded, all users should download the latest parameter changes, and calculate the evaluation values such as F1-scores (or the corresponding evaluation values obtained through other verification methods) by employing their sets of verification data, and then synchronize the corresponding evaluation results to the blockchain smart contract. It should be noted that in the collaborative learning method provided in the disclosure, each user should have the same training goal, such as the same depth model.

The second part is the server. The server conducts data interaction with the users and the blockchain, such as uploading and downloading model parameters or changes, and transaction broadcasting of hash values corresponding to parameters or changes. In addition, the server also maintains the global model, and updates the global model using the parameter changes uploaded by the target users. At the same time, the server should store the public key of each user to verify the user's signature data. In order to prevent the server from being attacked and malicious tampering of parameters, the hash values of changes, uploaded by all users, need to be appended to the data field of the blockchain transaction, and the transaction number corresponding to the downloaded changes may be returned to each user, namely Tx-ID is used to verify the consistency of changes and prevent the occurrence of the above malicious behaviors.

The third part is the blockchain and the smart contract on the chain. The hash value of the set of changes, uploaded by each user, needs to be attached to the field of transaction, and to be broadcasted to the blockchain network to ensure that the recorded hash value cannot be tampered with by the server. Because the performance of the existing public chain network is limited and the cost is high, this embodiment proposes to use a consortium chain with better performance, for example open source consortium chain projects such as Hyperledger fabric. At the same time, the built blockchain must support the operation of smart contracts. For example, Ethereum supports solidity contracts, and fabric supports high-level programming languages such as Golang and java. A smart contract is a computer agreement designed to digitize the negotiation or performance of a contract, so as to facilitate verification or enforcement. The smart contract allows credible transactions without a third party. These transactions are traceable and irreversible. The smart contract in the plan must run on the blockchain, and the blockchain provides a credible execution environment for smart contracts. Therefore, the consensus contract in the method of the disclosure is based on the above characteristics to ensure that a consensus on the optimal parameters can be formed in the user group, thereby ensuring the smooth convergence of the global model, and avoiding the influence of malicious users or low-quality parameters.

Figure 4:
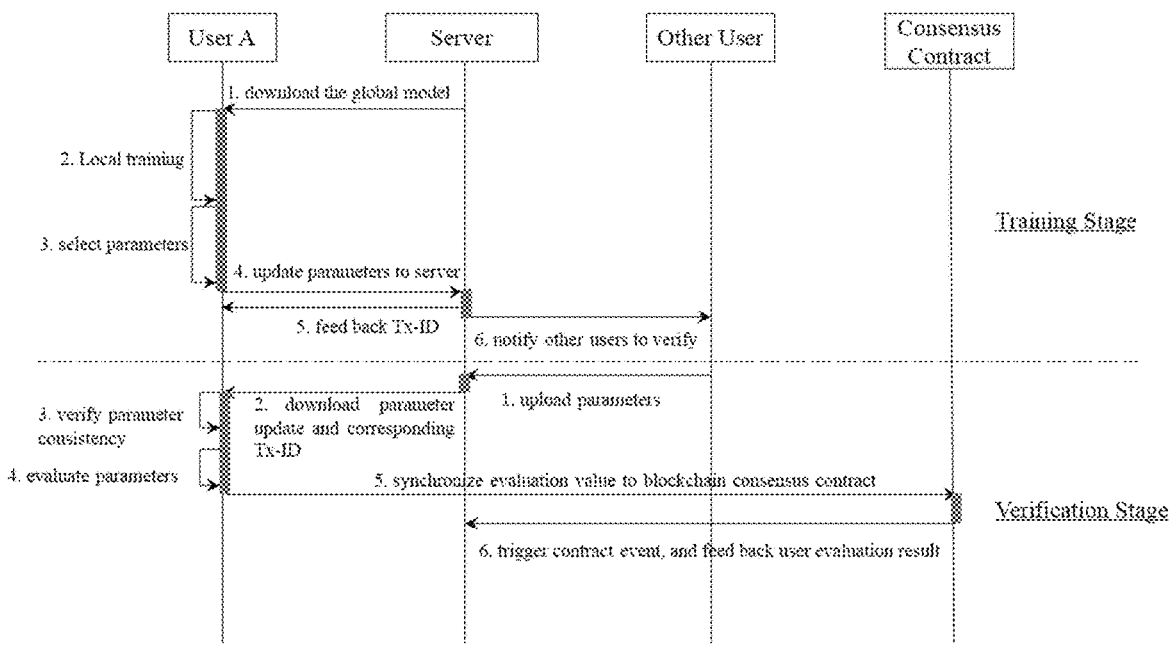
FIG. 4 is an operation sequence diagram when a user participates in collaboration according to an embodiment of the present disclosure.

As illustrated in FIG. 4, the operation sequence diagram required by each user in the user group in this embodiment is shown, which includes two stages, and each stage includes 6 steps.

Training Stage

Step 1, at the beginning of each round of training, the user needs to download the latest global model from the server for this round of training.

Step 2, the user employs the local set of training data for local training. The training methods of all users need to be consistent, such as using stochastic gradient descent.

After training the model with the local set of training data, it is necessary to calculate a set $\overrightarrow{\Delta\theta}$ of changes on current parameters. The user trains the global model based on the local set of training data to generate the set of changes on the current parameters by a formula of:

$$\theta'_i = \theta_i - \alpha \frac{\partial}{\partial \theta_i} E(\overrightarrow{\theta_g}),$$

$$\Delta\theta_i = \theta'_i - \theta_i,$$

where, $\theta'_i$ represents a parameter value after the global model is trained, $\theta_i$ represents a parameter value before the global model is trained, $\alpha$ represents a learning rate, E represents an epoch, and $\Delta\theta_i$ represents a parameter change of the global model, and is an element in $\overrightarrow{\Delta\theta}$.

Step 3, elements in $\overrightarrow{\Delta\theta}$ are ranked in descending order, and a set $\overrightarrow{\Delta\theta^u}$ of changes may be selected from $\overrightarrow{\Delta\theta}$ for updating. It is noted that, the selecting ratio at this time will affect the efficiency of the system operation, and the ratio is recorded as $\gamma$, that is $|\overrightarrow{\Delta\theta^u}|=\gamma|\overrightarrow{\Delta\theta}|$. The larger the ratio $\gamma$, the higher the update degree of the model, which can slightly increase the rate of global model convergence, but the corresponding communication bandwidth is also larger, because each user needs to interact with the server more parameters. Therefore, it is recommended that $\gamma$ can be located in the interval [0.01, 0.2]. The ratio may be adjusted according to the overall size of the actual model parameters, and the two important factors of communication efficiency and convergence rate may also be considered.

In detail, a set $\overrightarrow{\Delta\theta^u}$ of changes is selected by a formula of:

$$\overrightarrow{\Delta\theta^u} = \max_{|\overrightarrow{\Delta\theta^u}|=\gamma|\overrightarrow{\Delta\theta}|} \overrightarrow{\Delta\theta}$$

where, $\gamma$ represents the ratio.

Step 4, $\overrightarrow{\Delta\theta^u}$ and the corresponding timestamp signature may be updated to the server to prevent malicious actions such as simple replay attacks.

Step 5, the server feeds back and records the transaction Tx-ID on the chain. After the user receives the Tx-ID, it verifies whether the storage on the chain is consistent with the uploaded parameters, so as to prevent the server from tampering with the parameters and sending them to other users.

Step 6, the server notifies other users to download the latest parameter update to verify.

Verification Stage

Step 1, when other users upload new parameter update, the server notifies the current user to download and evaluate the uploaded parameters.

Step 2, the user downloads the parameter update and the corresponding blockchain transaction Tx-ID.

Step 3, the parameter hash Hash_para stored on the chain may be queried, and may be compared with the hash value corresponding to the downloaded parameters, so as to ensure that the downloaded parameters will not be maliciously tampered with by the server.

Step 4, the local set of verification data is employed to evaluate the parameters. It should be noted that the evaluation methods need to be consistent, such as using commonly used evaluation methods for example, F1 and accuracy rate, so as to verify the pros and cons of parameters updated by other users.

Step 5, the user synchronizes the corresponding evaluation value to the blockchain consensus contract. The consensus contract needs to set aside the corresponding contract interface for users to call.

Step 6, the contract event is triggered, and the corresponding evaluation result is notified to the server. Here, the server needs to monitor the contract event on the blockchain. Once the event is triggered, the server captures the corresponding event type and executes the corresponding callback response according to the event type. For example, once the user submits the latest evaluation value, the server needs to capture the corresponding contract event to ensure the consistency of the content and the data on the chain.

Figure 5:
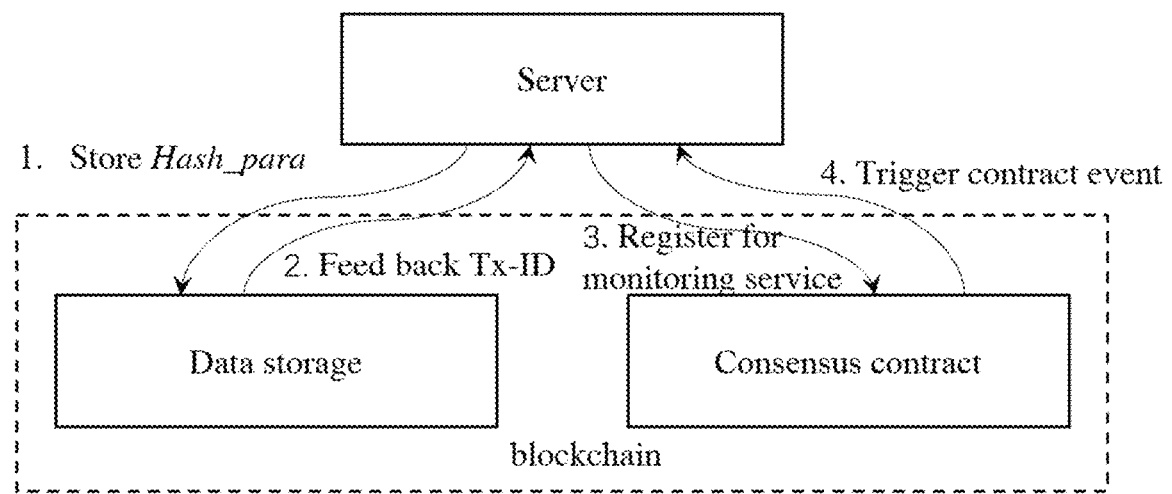
FIG. 5 is a schematic diagram of an interaction between a server and a blockchain according to an embodiment of the disclosure.

As illustrated in FIG. 5, the interaction between the server and the blockchain is shown, which may include 4 steps.

Step 1, when the user uploads the parameters, the server appends the hash value Hash_para corresponding to the parameters to the data field of transaction, and to record on the blockchain.

Step 2, the blockchain feeds back the corresponding transaction Tx-ID. Tx-ID is a hash value that uniquely identifies a transaction. The server feeds back this Tx-ID to the user to verify the consistency of downloaded parameters.

Step 3, the server registers for the monitoring service. The consensus contract needs to write the corresponding contract event, and the server monitors the corresponding event callback response and handles the event accordingly.

Step 4, the contract function is called by the user, and the corresponding event is thrown, which is captured by the server. After the server captures the corresponding event, it will respond accordingly according to the event type. For example, when the user evaluates the parameters and obtains the corresponding evaluation result, the contract will trigger the corresponding event, and the server needs to capture the corresponding event and synchronize the data in time.

Figure 6:
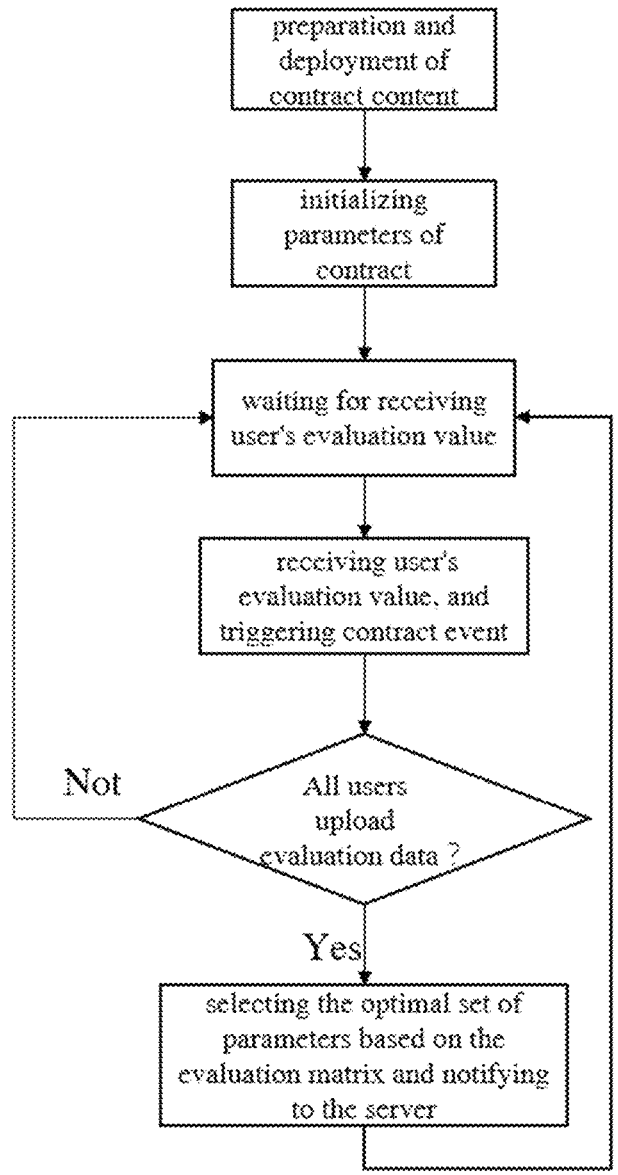
FIG. 6 is a logic diagram of a smart contract content according to an embodiment of the disclosure.

As illustrated in FIG. 6, the data processing flowchart of the consensus contract is shown, and there are 5 steps.

Step 1, preparation and deployment of contract content. The function interface and the corresponding event type need to be defined in the contract.

Step 2, the internal parameters of the contract may be initialized, which may include: the number n of target users, and evaluation matrix M, etc. The number n affects the rate of model convergence. For example, a larger number n means that the server will choose more parameters to aggregate into the global model each time. If there are a large number of low-quality data sets or malicious users, it may introduce negative effects to the global model. Therefore, the value of n should adapt to the number of users actually participating in collaborative training and the differences between data sets.

Step 3, it waits to receive the user's evaluation value.

Step 4, after receiving the user's evaluation value, the value of the corresponding element in the evaluation matrix M may be updated, and a corresponding event is thrown to notify the server of the latest user evaluation parameter. Then it is judged whether the evaluation among all users has been received. If there are still users who have not uploaded parameters in the current round, it skips to step 3. Otherwise, when each round of training times out or all users have trained and evaluated the model, it skips to step 5.

Step 5, based on the evaluation matrix M, the set $\overrightarrow{C_{new}}$ of target users in the current round is elected, and the server is notified of this set. After the server receives the set $\overrightarrow{C_{new}}$ of target users, the severs aggregates to the global model according to the changes uploaded by each user in $\overrightarrow{C_{new}}$, and informs all users to download the latest global model, and then start the next round of training process.

The sign of the end of the collaborative training process can be agreed by the user group. For example, when the accuracy of the model reaches the user's expected value, or when there are enough training rounds, the collaborative training process is stopped, and each user can download the latest update deep model from the parameter server. According to the size of the actual model, the parameter server needs to allocate suitable bandwidth for each user to ensure the continuity of the collaborative training process.

With the secure collaborative deep learning method based on blockchain according to the embodiment of the present, key data may be stored by using the blockchain as a trusted infrastructure, consensus election of optimal parameters may be realized by using trusted execution results of smart contracts, and participating users interact parameters changes with each other by using a global parameter server as an intermediate bridge. The users conduct collaborative training through parameter sharing, which not only allows the model to learn the characteristics of all data sources, but also protects data privacy. The users may elect the optimal parameters through the consensus contract to ensure the smooth convergence of the model.

Figure 7:
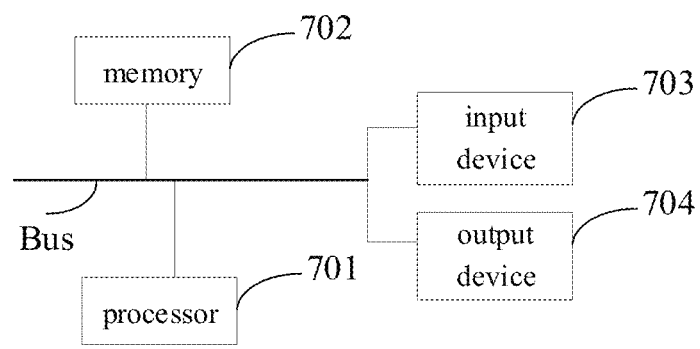
FIG. 7 is a block diagram of a collaborative deep learning apparatus according to an embodiment of the disclosure.

FIG. 7 is a block diagram of a collaborative deep learning apparatus according to an embodiment of the disclosure.

As illustrated in FIG. 7, the apparatus may include: one or more processors 701, a memory 702, and interfaces for connecting various components, including high-speed interfaces and low-speed interfaces. The processor may process instructions executed within the apparatus, including instructions stored in the memory or on the memory to display graphical information of the GUI (Graphical User Interface) on an external input/output device such as a display device coupled to the interface. In other embodiments, a plurality of processors and/or buses can be used with a plurality of memories and processors, if desired. A processor 701 is taken as an example in FIG. 7.

The memory 702 is a non-transitory computer-readable storage medium according to the disclosure. The memory stores instructions executable by at least one processor, so that the at least one processor executes the above method. The non-transitory computer-readable storage medium of the disclosure stores computer instructions that are configured to cause a computer to execute the above method.

As the non-transitory computer-readable storage medium, the memory 702 is configured to store non-transitory software programs, non-transitory computer executable programs and modules, such as program instructions/modules corresponding to the above method. The processor 701 executes various functional applications and data processing of the apparatus by running non-transitory software programs, instructions, and modules stored in the memory 702, that is, implementing the above method.

In addition, the memory 702 may include a high-speed random-access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the apparatus through a network. Examples of the above network include, but are not limited to, the Internet, an intranet, a local area network, a mobile communication network, and combinations thereof.

The apparatus may further include an input device 703 and an output device 704. The processor 701, the memory 702, the input device 703, and the output device 704 may be connected through a bus or in other manners. In FIG. 7, the connection through the bus is taken as an example.

The input device 703 may receive inputted numeric or character information, and generate key signal inputs related to user settings and function control of the apparatus, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general-purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

It should be understood that the various forms of processes shown above can be used to reorder, add, or delete steps. For example, the steps described in this disclosure can be executed in parallel, sequentially, or in different orders, as long as the desired results of the technical solutions disclosed in this disclosure can be achieved, which is no limited herein.

The foregoing specific implementations do not constitute a limitation on the protection scope of the present disclosure. It should be understood by those skilled in the art that various modifications, combinations, sub-combinations, and substitutions may be made according to design requirements and other factors. Any modification, equivalent replacement and improvement made within the spirit and principle of this disclosure shall be included in the protection scope of this disclosure.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless specified otherwise. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature is at a height higher than that of the second feature. While a first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the disclosure, and changes, alternatives, and modifications can be made in the embodiments without departing from spirit, principles and scope of the disclosure.

What is claimed is:

1. A collaborative deep learning method, implemented by a server, and the method comprising:
    sending an instruction for downloading a global model to a plurality of user terminals, the global model having a set of current parameters, such that each of the plurality of user terminals downloads the global model based on the instruction, and trains the global model based on a set of training data to generate a set of changes on a part of the current parameters;
    receiving the set of changes from each of the plurality of user terminals;
    storing the set of changes from each of the plurality of user terminals;
    recording a hash value of the set of changes from each of the plurality of user terminals into a blockchain;
    obtaining a storage transaction number from the blockchain for the hash value of the set of changes from each of the plurality of user terminals;
    sending the set of changes from each of the plurality of user terminals and the storage transaction number to the plurality of user terminals, such that each of the plurality of user terminals verifies and evaluates received sets of changes and storage transaction numbers based on a set of verification data, to generate a plurality of evaluation values, and stores the plurality of evaluation values into the blockchain, and the blockchain updates an evaluation matrix based on the plurality of evaluation values from each of the plurality of user terminals, and select a set of target user terminals based on the updated evaluation matrix and a preset consensus contract in the blockchain from the plurality of user terminals;

receiving the set of target user terminals from the blockchain;
updating the current parameters of the global model based on sets of changes corresponding to the set of target user terminals; and
returning the sending the instruction for downloading the global model to the plurality of user terminals, to update the global model until the global model meets a preset condition;
wherein the blockchain updates the evaluation matrix based on the plurality of evaluation values from each of the plurality of user terminals by actions:
marking $M_i$: as evaluation values of the $i^{th}$ user to all users, where M represents the evaluation matrix, and $M_{ij}$ represents resents an evaluation value of the $i_{th}$ user to the $j^{th}$ user;
ranking $M_{i:}$ in descending order as $M_i$, in which, a score of the $j^{th}$ user is denoted, based on an arrangement of $M_i$, by a formula of:

$$s(j) = \begin{cases} m - p_j + 1, & m \geq p_j - 1 \\ 0, & \text{else} \end{cases},$$

where, s(j) represents the score of the $j^{th}$ user, m represents the number of the plurality of users, and $p_j$ represents a location of the $j^{th}$ user in $M_i$,
obtaining a total score of the $j^{th}$ user by a formula of:

$$S(j) = \sum_{u_i \in \vec{u}}^{i \neq j} s(j; u_i)$$

where, $u_i$ represents the $i^{th}$ user, $\vec{u}$ represents the plurality of users, $s(j; u_i)$
represents a score of the $j^{th}$ user under evaluation of $u_i$; and
selecting the set $\overline{C_{new}}$ of target user terminals by a formula of:

$\overline{C_{new}}$=argmax $S(j; \vec{u})$.

2. The method of claim 1, wherein the global model is negotiated by the plurality of user terminals and maintained by the server.

3. The method of claim 1, wherein the set of current parameters comprises a set of initialization parameters under a case that the global model is trained for the first time.

4. The method of claim 1, wherein each of the plurality of user terminals trains the global model based on the set of training data to generate a set of changes on the current parameters, and ranks changes in the set of changes on the current parameters in descending order, and selects the set of changes on the part of the current parameters from the set of changes on the current parameters based on a ranking result.

5. The method of claim 4, wherein each of the plurality of user terminals, through a ratio, selects the set of changes on the part of the current parameters from the set of changes on the current parameters based on the ranking result.

6. The method of claim 4, wherein the set of changes from each of the plurality of user terminals, is added with a timestamp by each of the plurality of user terminals, and is signed by each of the plurality of user terminals.

7. The method of claim 1, wherein a number of user terminals in the set of target user terminals is less than a number of the plurality of user terminals.

8. The method of claim 1, wherein receiving the set of target user terminals from the blockchain comprises:
monitoring a contract event triggered in the blockchain; and
receiving the set of target user terminals from the blockchain when the contract event triggered in the blockchain is monitored.

9. The method of claim 1, wherein the preset condition comprises an accuracy rate of the global model reaching an expected value or a number of training rounds reaching a preset value.

10. A collaborative deep learning apparatus, comprising:
a processor; and
a memory for storing instructions executable by the processor;
wherein the processor is configured to carry out:
sending an instruction for downloading a global model to a plurality of user terminals, the global model having a set of current parameters, such that each of the plurality of user terminals downloads the global model based on the instruction, and trains the global model based on a set of training data to generate a set of changes on a part of the current parameters;
receiving the set of changes from each of the plurality of user terminals;
storing the set of changes from each of the plurality of user terminals;
recording a hash value of the set of changes from each of the plurality of user terminals into a blockchain;
obtaining a storage transaction number from the blockchain for the hash value of the set of changes from each of the plurality of user terminals;
sending the set of changes from each of the plurality of user terminals and the storage transaction number to the plurality of user terminals, such that each of the plurality of user terminals verifies and evaluates received sets of changes and storage transaction numbers based on a set of verification data, to generate a plurality of evaluation values, and stores the plurality of evaluation values into the blockchain, and the blockchain updates an evaluation matrix based on the plurality of evaluation values from each of the plurality of user terminals, and select a set of target user terminals based on the updated evaluation matrix and a preset consensus contract in the blockchain from the plurality of user terminals;
receiving the set of target user terminals from the blockchain;
updating the current parameters of the global model based on sets of changes corresponding to the set of target user terminals; and
returning the sending the instruction for downloading the global model to the plurality of user terminals, to update the global model until the global model meets a preset condition,
wherein the blockchain updates the evaluation matrix based on the plurality of evaluation values from each of the plurality of user terminals by actions:
marking $M_i$, as evaluation values of the $j^{th}$ user to all users, where M represents the evaluation matrix, and $M_{i,j}$ represents an evaluation value of the $i^{th}$ user to the $j^{th}$ user;
ranking $M_{i:}$ in descending order as $M_i$, in which, a score of the $j^{th}$ user is denoted, based on an arrangement of $M_i$, by a formula of:

$$s(j) = \begin{cases} m - p_j + 1, & m \geq p_j - 1 \\ 0, & \text{else} \end{cases},$$

where, s(j) represents the score of the $j^{th}$ user, m represents the number of the plurality of users, and $p_j$ represents a location of the $j^{th}$ user in $M_i$, obtaining a total score of the $j^{th}$ user by a formula of:

$$S(j) = \sum_{u_i \in \vec{u}}^{i \neq j} s(j; u_i)$$

where, $u_i$ represents the $i^{th}$ user, $\vec{u}$ represents the plurality of users, $s(j;u_i)$ represents a score of the $j^{th}$ user under evaluation of $u_i$; and selecting the set $\overline{C_{new}}$ target user terminals by a formula of:

$\overline{C_{new}}$=argmax $S(j;\vec{u})$.

11. The apparatus of claim 10, wherein the global model is negotiated by the plurality of user terminals and maintained by the apparatus.

12. The apparatus of claim 10, wherein the set of current parameters comprises a set of initialization parameters under a case that the global model is trained for the first time.

13. The apparatus of claim 10, wherein each of the plurality of user terminals trains the global model based on the set of training data to generate a set of changes on the current parameters, and ranks changes in the set of changes on the current parameters in descending order, and selects the set of changes on the part of the current parameters from the set of changes on the current parameters based on a ranking result.

14. The apparatus of claim 13, wherein each of the plurality of user terminals, through a ratio, selects the set of changes on the part of the current parameters from the set of changes on the current parameters based on the ranking result.

15. The apparatus of claim 13, wherein the set of changes from each of the plurality of user terminals, is added with a timestamp by each of the plurality of user terminals, and is signed by each of the plurality of user terminals.

16. The apparatus of claim 10, wherein a number of user terminals in the set of target user terminals is less than a number of the plurality of user terminals.

17. The apparatus of claim 10, wherein receiving the set of target user terminals from the blockchain comprises:
monitoring a contract event triggered in the blockchain; and
receiving the set of target user terminals from the blockchain when the contract event triggered in the blockchain is monitored.

18. The apparatus of claim 10, wherein the preset condition comprises an accuracy rate of the global model reaching an expected value or a number of training rounds reaching a preset value.

* * * * *